WIDE ANGLE VIEWING APPARATUS FOR HIGH VACUUM SYSTEMS
Filed Sept. 26, 1961 3 Sheets-Sheet 1
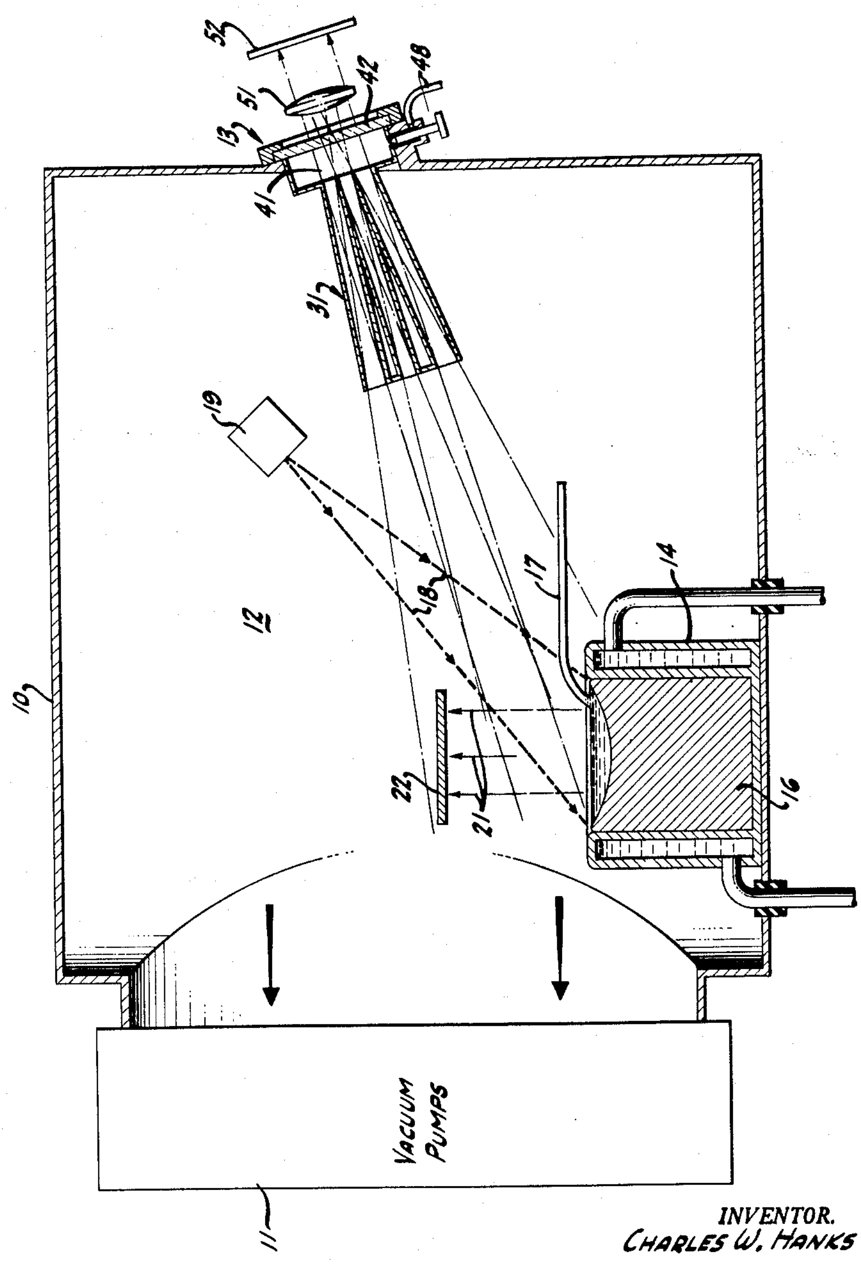
INVENTOR.
CHARLES W. HANKS
BY
Lippincott, Ralls & Hendricson
ATTORNEYS

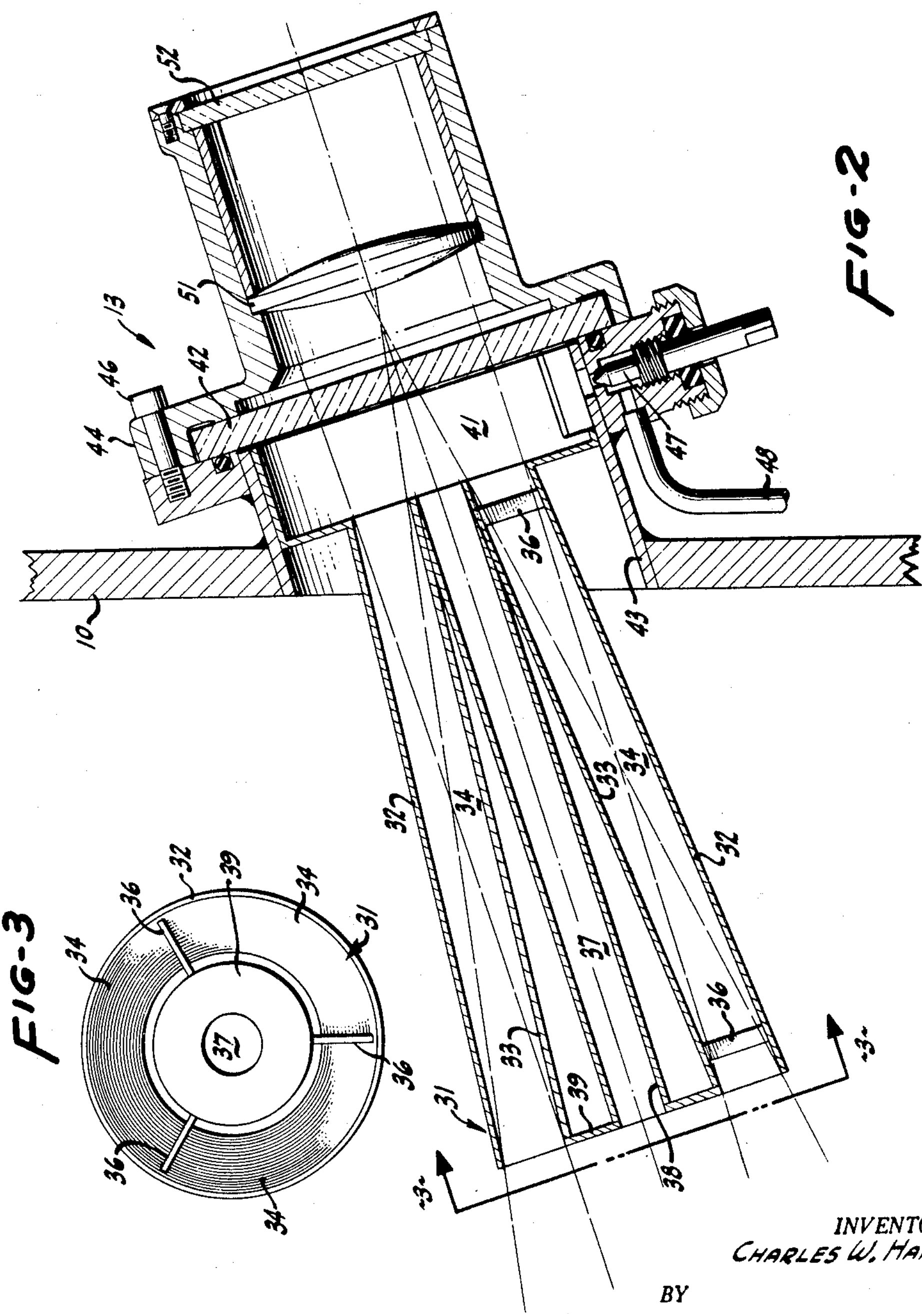
INVENTOR.
CHARLES W. HANKS
BY
Lippincott, Ralls & Hendricson
ATTORNEYS

WIDE ANGLE VIEWING APPARATUS FOR HIGH VACUUM SYSTEMS

Filed Sept. 26, 1961 3 Sheets-Sheet 3

INVENTOR.
CHARLES W. HANKS
BY
Lippincott, Ralls & Hendricson
ATTORNEYS

United States Patent Office 3,114,790

Patented Dec. 17, 1963

3,114,790

WIDE ANGLE VIEWING APPARATUS FOR HIGH VACUUM SYSTEMS

Charles W. Hanks, Orinda, Calif., assignor to Temescal Metallurgical Corporation, Berkeley, Calif., a corporation of California Filed Sept. 26, 1961, Ser. No. 140,918
9 Claims. (Cl. 88—1)

The invention hereof relates to an improved apparatus for providing a clear wide angle field of vision into a high vacuum system, particularly a system in which condensable vapors exist that would normally cloud or obscure windows installed in the walls of the vacuum chamber. The invention hereof is particularly applicable for use in production models of equipment for vacuum evaporation and deposition, high vacuum casting furnaces, and various other high vacuum systems wherein there is encountered a prolonged generation of condensable vapor in substantial quantity.

It is well known that considerable difficulty is normally encountered in satisfactorily viewing the interior of high vacuum chambers wherein condensable material is evolved. Inasmuch as continuously operating vacuum systems are attaining increasing importance in a wide variety of fields, this problem is becoming even more acute. Difficulties arise in this respect because of the unavoidable dispersion of vapor molecules in a vacuum system and the consequent condensation of such vapors upon interior walls and the like of the vacuum system. Windows or other viewing apparatus installed in the walls of such systems thus become coated with condensed vapors after a relatively short time, and consequently obstruct viewing of the interior of the chamber from the outside thereof. In operation of these types of devices it is highly advantageous and often necessary to visually observe conditions within the apparatus, and consequently, it is necessary to provide some type of operable viewing means therewith. Furthermore, the larger the apparatus the more difficult becomes the problem, inasmuch as enlarged fields of view are required, consequently necessitating the provision of windows of increased size which are then even more readily coated with condensable vapors upon the interior surfaces thereof.

It is well known that various types of viewing apparatus have been proposed in the past, with the majority of these being directed to alternative applications, wherein the maintenance of a high vacuum within the chamber being viewed is of no significance. These approaches to the problem are unsuited for vacuum applications, inasmuch as they normally require the provision of streams of air or gas flowing across the interior surface of viewing ports and such is quite incompatible with the maintenance of a high vacuum. In distinction to these types of prior art approaches, there has also been advanced the novel method of viewing the interior of vacuum chambers disclosed and claimed in the co-pending patent application of Charles d'A. Hunt, Serial No. 140,750, entitled High Vacuum Observation Method, filed in the U.S. Patent Office on September 26, 1961, and assigned to the same assignee as the present application. As regards this method of viewing, it is briefly noted that same provides for the condensation of vapor by the provision of an elongated viewing tube within which there is provided a gas to establish molecular collisions whereby vapor molecules are condensed upon the walls of such a tube. It is necessary, in the above noted method, for the viewing tube to have a limited cross-sectional dimension so as to appear as a slot to the viewer, and while such a method does provide advancement in the art, it does furthermore have the disadvantage of providing a very limited field of view to an observer disposed exteriorly of the chamber being viewed. While it is possible to mount the viewing tube of the foregoing method for pivoting or movement, it will be appreciated that this in itself introduces substantial complexity in the requisite structure. As regards various high vacuum applications such as, for example, the above noted high production melting and casting furnaces and high production high vacuum plating mills, it will be appreciated that an observer requires and extensive field of view within the vacuum chamber in order to fully monitor operations therein. The present invention provides this requisite extended field of view, while at the same time preventing the coating of viewing ports.

In common with the method described and claimed in the above noted co-pending patent application the present invention employs a collision process for the deflection of vapor molecules into impingement upon walls of the viewing apparatus whereupon same condense. It will be readily recognized that the maintenance of truly high vacuum conditions precludes the utilization of large volume gas flow therein, particularly as same may be related viewing apparatus and, consequently, the limitations of the above noted method are herein applicable. Thus, the limitation upon physical size, i.e., cross-sectional dimension of an elongated viewing means, must also apply in the present instance in order to insure the presence of a sufficient gas concentration to insure desired collision processes while at the same time limiting gas flow into the vacuum chamber.

There is provided by the present invention for the maintenance of this minimum cross-sectional dimension, while at the same time extending the field of view by an annular configuration. This is herein accomplished through the utilization of nesting cones, together with a suitable optical lens so that the required narrow slot-like passage for the limitation of gas flow is yet retained, while at the same time presenting to the observer a large circular field of vision.

The present invention is illustrated as to a particular preferred embodiment thereof in the accompanying drawings, wherein:

FIGURE 1 is a schematic illustration in sectional view of a high vacuum plating furnace having viewing apparatus in accordance with the present invention mounted therein;

FIGURE 2 is a sectional view longitudinally through viewing apparatus in accordance with this invention;

FIGURE 3 is an end view of the viewing apparatus of FIGURE 2, and taken in the plane 3—3 of FIGURE 2.

Figure 4:
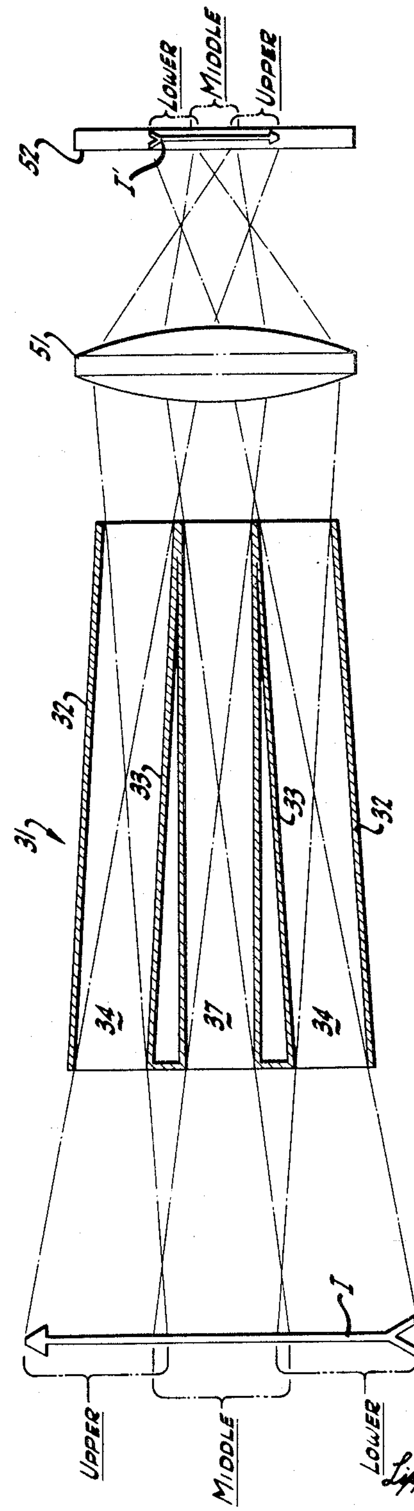
FIGURE 4 is a schematic illustration of the optical focusing accomplished with the present invention as an aid to the understanding of the extended field of view available therewith.

The present invention, in brief, comprises nested concentric cones of substantial length and separated from each other by relatively small distances to thereby define elongated passages of minimum cross-sectional dimension. A central passage is also provided through this nested cone arrangement and a focusing lens is disposed at the smaller end of these cones for the purpose of focusing light transmitted through the above noted openings or passages defined by the conical arrangement. The image focused by this lens may be directed upon a ground glass screen or other means so that an observer viewing such focused image does not see the conical structure, but instead views only the area exposed to the larger end of the conical arrangement. This apparent disappearance of the conical elements results from the focusing of divergent light rays entering all parts of the annular outer passage together with the focusing of light rays entering the central passage, so that there is produced a complete focused image upon the screen or the like. Light rays emanating in different directions from portions of the image viewed do actually overlap in passage through the passageways of the conical arrangement hereof, and consequently, it is possible for the lens to focus these light rays to complete a reconstructed image without any blank spots resulting from the conical portions of the viewing apparatus.

Considering now the invention in somewhat greater detail, reference is first made to FIGURE 1 of the drawing wherein there is illustrated high vacuum plating apparatus in which a substantial quantity of condensable vapor is evolved during operation and with which the wide viewing apparatus of the present invention may be advantageously employed. While this type of vacuum apparatus is only exemplary of vacuum equipment with which the present invention may be associated, it is herein presented as an example and setting for the present invention inasmuch as the circumstances and conditions involved in this type of process produce about the most difficult situation with regard to the exterior viewing or observation of operations within vacuum equipment. As shown in FIGURE 1, a vacuum enclosure 10 is provided with high speed vacuum pumping means 11 to maintain the interior vacuum chamber 12 at a high vacuum as, for example, the order of a micron of mercury or less. The viewing apparatus 13 of the present invention will be seen to be mounted in a wall of the enclosure 10 and generally directed toward an area of interest for observation from the exterior of this enclosure. Within the chamber there may be provided a water cooled crucible 14 containing an ingot 16 of refractory metal, for example, and adapted to be heated at the top thereof, in order to raise the temperature of this upper surface to a sufficient level for the melting and vaporization of another material such as aluminum, for example, which may be fed thereon as in the form of a wire 17. This heating of the upper surface of the block 16 may be performed by the direction of one or more high energy electron beams 18 thereon, and such is illustrated as being accomplished by a remotely located electron gun 19, also disposed within the chamber 12. As a result of this heating, there is vaporized material fed onto the top of a block 16 and this vapor may in fact be superheated to thereby rise rather vertically from the open top of the crucible as indicated by the arrows 21. The positioning of a suitable substrate 22 in the path of this rising vapor, will be seen to cause the vapor to impinge upon the under surface of such substrate, and consequently, to condense thereon for the formation of a coating upon such substrate. In accordance with known practices, the substrate or strip 22 may be moved over the crucible in order to accomplish a continuous plating process, and it has been found advantageous to coat a material such as black iron with aluminum or the like in the interests of producing a highly protective and adherent coating upon the strip 22.

Referring now to FIGURES 2 and 3 of the drawing hereof, it will be seen that the same illustrates in some detail a preferred embodiment of the invention hereof. The apparatus includes a viewing tube 31 adapted for extension through a wall of a vacuum enclosure 10 and generally directed toward a portion of the vacuum chamber desired to be visually observed from the exterior thereof. As to the physical structure of this viewing tube, it will be seen that same includes an outer conical member 32 and a concentric inner conical member 33 having the larger ends thereof disposed at the inner end of the viewing tube most closely adjacent to the image to be viewed. These two conical members 32 and 33 are disposed in concentric relation with a relatively small radial separation therebetween so as to define an annular conical passage 34 extending the complete length of the viewing tube and open at both ends. Structurally the inner and outer conical members 32 and 33 may be secured together by thin webs 36, extending generally radially between same and preferably having quite a small cross section.

In addition to this annular passage 34 defined by the conical outer and inner elements 32 and 33, there is additionally defined an axial passage 37 through the viewing tube and in order to limit the cross section of this axial passage, there is provided a tubular member 38 along the axis of the conical members and having an inner diameter equal to the inner diameter of the smaller conical member at the small end thereof. This tube 38 may be physically connected to and within the inner conical member 33 by direct joinder at the small end of the latter and by an annular ring 39 extending from the tube to the conical member at the large end thereof.

It will be seen that the viewing tube thus includes or defines an outer, generally annular, passage 34 which tapers radially inward so as to have somewhat of a conical shape together with a second axial passage 37 concentric with this outer passage. At the outer end of the viewing tube there is formed an enlarged chamber 41 whereat the separate tube passages 34 and 37 combine, and a window 42 is disposed across this enlarged chamber 41. Insofar as structural details are concerned, there may be provided a cylindrical mounting 43 connected to or forming a part of the chamber 41, and adapted for sealing relation at an opening in a vacuum enclosure 10, as illustrated. The window 42 which may, for example, be formed of Pyrex or the like may be secured to the viewing tube by means of a clamping tube 44 having bolts or the like 46, thereabout secured to a radial extension of the mounting cylinder 43. Suitable sealing means such as gaskets, O rings or the like are provided in connection with this window 42 in order to insure a vacuum tight closure of the outer end of the viewing tube.

In addition to the foregoing, the viewing apparatus of the present invention provides for the introduction of a gas into the viewing tube at the outer end thereof adjacent the window 42. Various means may be employed in this connection, and there is illustrated a small valve 47 mounted upon the outer end of the viewing tube and providing controlled limited communication between the chamber 41 of this tube and a pipe or the like 48 extending to a source of gas. Pressure reduction is afforded by very limited opening of the valve 47 for, as noted below, it is highly necessary herein that only an extremely small amount of gas be continuously introduced into the outer end of the viewing tube.

As regards the optical portion of the present invention, there may be provided a lens system herein illustrated only as a single lens 51 mounted in the clamping tube 44, upon an extension of the axis of the viewing tube and exteriorly of the window closing the outer end thereof. In the illustrated embodiment, there is also provided a ground glass screen 52, which may be likewise mounted in this clamping tube 44 behind the lens 51. An image projected through the passages 34 and 37 of the viewing tube is focused by the lens 51 upon the ground glass screen 52 for ready observance by one disposed exteriorly of the vacuum enclosure 10. Obviously various types of lens systems and projection systems may be employed, and the one illustrated is only exemplary.

In connection with the focused reconstruction of an image viewed through the apparatus hereof, reference is made to FIGURE 4 of the drawing as a pictorial representation of light paths affording the wide angle viewing hereof. An image I depicted as an arrow, is shown disposed in front of the schematically illustrated viewing tube 31. In this illustration light rays are indicated by light lines extending from the image I and it will be seen that such light rays extending from the upper portion of the image traverse the upper portion of the annular viewing tube passage 34, and are consequently focused by the lens 51 upon the ground glass screen 52 as the head of the arrow of a reconstructed image I'. Similarly light rays from the lower portion of the image I extend through the lower part of the annular passage 34, and are then focused by the lens 51 as the tail of the reconstructed image I'. Light rays from the center portion or middle of the image I extend through the central passage 37 of the viewing tube and are then focused upon the screen to form the middle part of the reconstructed image I'. It will be seen in this instance that the image upon the screen is inverted, however, it will be appreciated that alternative lens systems may be employed if it is desired to reverse the reconstructed image. As will be seen from a consideration of FIGURE 4, the focused image I' does not include any portion of a viewing tube and that furthermore it does not have any blanked out portions resulting from obstructions caused by the viewing tube. In the absence of the lens system employed with the conical elements of the viewing tube it will furthermore be seen, as by reference to FIGURE 3, that a very slight, if any, viewing would be possible through the conical configuration hereof.

Consequently, the present invention will be seen to include a combination of nested conical elements defining passages of requisite limited lateral dimensions together with a lens system focusing light transmitted through such passage to thereby reconstruct and focus an image which encompasses a wide viewing angle in front of the apparatus hereof. An operator employing the viewing apparatus of the present invention does not realize from looking at the screen thereof that the passage between the screen and the image viewed is actually obstructed, for the focused image provides no indication of this. It is furthermore noted that the illustration of FIGURE 4 is only a two dimensional indication of light focusing and does not purport to show the focusing of light in a dimension perpendicular to the plane of the paper, although it will be seen that the same illustration and explanation would be applicable to this dimension. It is furthermore noted that the concentric nested conical elements of the viewing tube hereof only optically influence the transmitted image to the extent of slightly reducing the brightness thereof, because of the reduction of area for the transmittal of light to the lens.

Operation of the present invention in connection with applications such as that illustrated in FIGURE 1 follow from the above description. With the wide angle viewing apparatus 13 mounted in the wall of a vacuum enclosure 10, there is then introduced a small quantity of permanent gas into the viewing tube immediately adjacent the outer window 42 thereof. This is accomplished by means of the valve 47 admitting a small flow of gas through the tube 48 from an exterior gas supply. Owing to the restricted nature of the passages 34 and 37 through the viewing tube, there is provided a material resistance to the flow of gas from the chamber 41 into the actual vacuum chamber 12. Consequently, it is possible to maintain a desired gas concentration in the passages of the viewing tube without the introduction of an undue amount of gas in the vacuum chamber. This introduced gas, preferably an inert gas, will be seen to move generally from the outer to the inner end of the viewing tube and the gas molecules encounter deflecting collisions with vapor molecules migrating through the viewing tube passages toward the window 42. Inasmuch as vapor molecules only enter the vapor tube with random directions of motion, it will be seen that a large majority of same will naturally impinge upon the walls of the viewing tube, and that these vapor molecules condense thereupon. So far as those vapor molecules originally entering the viewing tube passages in such a direction as to traverse same without normally impinging upon the tube walls, the gas molecules provide for deflecting collisions therewith, and, consequently, do redirect such vapor molecules onto the walls of the tube whereby these also condense. With the greatest gas concentration at the outer end of the viewing tube, it will be seen that the greatest probability of molecular collisions occur in this area and that this is highly desirable inasmuch as those vapor molecules reaching such a point are the molecules with the greatest momentum and most likelihood of directly impinging upon the window to thereby coat same. Furthermore, the gas molecules have a momentum inwardly of the viewing tube from the small to the large end thereof, and consequently, molecular collisions between vapor molecules and these gas molecules produce the most desirable momentum changes for maximum deflection of the vapor molecules.

In operation it is contemplated that the viewing apparatus of the present invention may be employed in connection with vacuum apparatus having the vacuum chamber thereof maintained at extremely low pressures as, for example, of the order of 0.1 micron of mercury. In such an instance it has been found that the introduction of an inert gas into the viewing tube chamber 41 at a pressure of about 5 microns of mercury is sufficient to fully protect the viewing window 42 even under those circumstances where extremely large quantities of vapor are generated within the vacuum apparatus. It has further been found from extensive investigation, that the amount of gas necessary to provide this gas pressure in the viewing tube chamber 41 will not introduce a sufficient gas flow into a vacuum chamber maintained at the above noted low pressure to materially affect such pressure. Quite apparently high speed vacuum pumping means must be employed with vacuum apparatus of the type depicted in FIGURE 1 contemplated for utilization with the present invention, and the extremely small flow of gas through the viewing apparatus hereof is found not to provide any source of difficulty in the maintenance of desired low pressures in vacuum equipment having such pumping capacity.

As an illustration of typical dimensions of a successful configuration, a conical viewing tube has been used which is 6 inches long and composed of two, nesting, concentric cones having parallel sides. The outer cone is 2 inches in diameter at the large end and ¾ inch in diameter at the small end, and the inner cone is 1⅝ inches in diameter at the large end and ⅜ inch in diameter at the small end. This provides an annular outer passage which is $\frac{3}{16}$ inch wide throughout the length of the tube. The central tube defines a cylindrical passage which is about ⅜ inch in diameter. With a tube of these dimensions and a vacuum system working at $\frac{1}{10}$ micron of mercury pressure, dry argon gas is bled into the viewing apparatus and a gas pressure of 10 microns of mercury is maintained at the upper, window end of the viewing tube. The gas flow at this pressure will cause the vacuum system pressure to rise approximately $\frac{1}{100}$ micron in a system having a pumping capacity of 20,000 litres per second. The density of gas which flows through the tube at this pressure will prevent all vapor from penetrating from the vacuum chambers to the window but the pressure of the vacuum system is affected to the extent of a $\frac{1}{100}$ micron increase in pressure, which is insignificant.

It is believed apparent that many modifications may be made in the actual structure of the present invention without departing from the concepts hereof, and it is noted in this respect that the illustrated and described embodiment of this invention is presented only as an exemplary thereof, and without intention to limit the invention thereby. Attention is thus invited to the following claims for a precise delineation of the true scope of this invention.

What is claimed is:

1. Wide angle viewing apparatus for vacuum equipment comprising a pair of elongated conical members disposed coaxially and adapted for disposition with the large cone ends directed into a vacuum chamber, said members together defining elongated passages having a large ratio of length to height, at least one lens disposed adjacent the small end of said conical members for focusing light transmitted through said passages, and means directing a small flow of gas into the small end of said conical members for deflecting vapor in a vacuum chamber onto said members for condensation and preventing such vapor from reaching the small ends of the conical members.

2. Wide angle viewing means for observation of the interior of a chamber wherein condensable vapor is present, comprising a viewing tube including an outer conical member and a concentric inner conical member with open ends, said tube defining an elongated annular passage of small radial dimension and an axial passage of small cross sectional dimension, means introducing a gas into said tube passages for molecular collisions with vapor tending to migrate through said tube, a window closing said viewing tube at the small ends of said conical members and protected from vapor condensation thereon, and a lens disposed on the opposite side of said window from said tube and focusing light transmitted through said tube passages to the exclusion of the inner conical member for presentation of a complete image having none of the tube portions included therein.

3. Wide angle viewing means for a vacuum chamber having condensable vapors generated therein comprising an elongated viewing tube adapted for extension into a vacuum chamber in sealing relation to a wall thereof, said tube including at least an inner and an outer member defining an annular conical passage joining with an axial passage at the outer end of said viewing tube, said passages having a large ratio of length to cross sectional dimension, a window closing the outer end of said viewing tube, means directing a gas into said tube adjacent said window for deflecting vapor molecules in said passages into impingement with closely spaced passage walls for condensation thereon, and a lens system exteriorly of said window for focusing light transmitted through said passages to reconstruct an image available to the tube front within the vacuum chamber without inclusion of the inner and outer members of said viewing tube in the reconstructed image.

4. Wide angle viewing apparatus for vacuum equipment comprising an elongated viewing tube adapted for extension into a vacuum chamber toward portions to be observed from the exterior of said chamber, said tube including members defining a narrow, open-ended passage of annular configuration tapering radially inward away from the chamber interior and a narrow, open-ended axial passage through said tube, a transparent element closing the outer end of said tube adjacent said tube members, means introducing an inert gas into said viewing tube adjacent said transparent element only in sufficient quantity to deflect substantially all vapor molecules entering the tube into impingement with the walls for condensation, and a lens system focusing light transmitted through said passages for a wide angle viewing of the interior of vacuum equipment.

5. Apparatus as set forth in claim 4 further defined by said tube members comprising first and second coaxial conical members spaced closely apart radially thereof to define said annular passage, the inner conical member having a cylindrical axial bore defining said axial passage.

6. Wide angle viewing apparatus for high-vacuum systems wherein condensable vapors may be present comprising a first member having an axial bore of limited cross-section and a conical exterior, a second member having a conical bore of substantially the same taper as the exterior of said first member and disposed concentrically about same in closely spaced-apart relation thereto, said two members defining an annular passage of substantially uniform height, mounting means engaging said members and adapted for sealing connection in a wall of a vacuum enclosure to direct the large end of said annular passage inwardly thereof, a window across the ends of said members at the small end of said annular passage, means introducing a small flow of gas into said passages adjacent said window for disposing gas therein to deflect vapor onto said members for condensation by molecular collision, said limited passage dimensions limiting gas flow from said passages, and a lens aligned with said window for focusing light transmitted through said passages to reconstruct a complete image in said vacuum chamber appearing in front of said members.

7. Apparatus as set forth in claim 6, further defined by said mounting means defining a chamber between said window and said members with said passages opening into such chamber, and valve means communicating with said chamber for admitting said gas therein to establish a pressure gradient of gas along said passages for maximizing vapor barrier action therein.

8. Wide angle viewing apparatus for high-vacuum systems having condensable vapors generated therein comprising a window, means mounting said window in sealing relation to a wall of said vacuum system at an opening therein, a plurality of nested conical members closely spaced together and extending from said window toward a viewing area within said vacuum system, means defining an axial opening of small cross-section through said conical members, means introducing a small amount of inert gas adjacent said window on the vacuum side thereof to establish a limited gas concentration in said axial passage and between said conical members for deflecting vapor by molecular collisions into impingement with said members for condensation thereon, and a convex lens focusing light reaching said window from said vacuum chamber to reconstruct images appearing in the vacuum system in front of said conical members.

9. Apparatus as set forth in claim 8, further characterized by said conical members having a common axis inclined downwardly from said window, and a screen behind said lens from said window for receiving said reconstructed images for viewing from the exterior of the vacuum system.

No references cited.